United States Patent
Kedefors et al.

(10) Patent No.: US 8,712,387 B2
(45) Date of Patent: Apr. 29, 2014

(54) SYSTEMS AND METHODS TO PROVIDE COMMUNICATION HISTORY FOR COMMUNICATION DEVICES

(75) Inventors: Hans Kedefors, Hillsborough, CA (US); King-Hwa Lee, Bellevue, WA (US); Peter S. Lim, Hillsborough, CA (US); Kevin Nix, Livermore, CA (US)

(73) Assignee: SAP AG, Walldorf (DE)

( * ) Notice: Subject to any disclaimer, the term of this patent is extended or adjusted under 35 U.S.C. 154(b) by 477 days.

(21) Appl. No.: 12/650,686

(22) Filed: Dec. 31, 2009

(65) Prior Publication Data

US 2011/0159854 A1 Jun. 30, 2011

(51) Int. Cl.
*H04M 3/42* (2006.01)

(52) U.S. Cl.
USPC ............ 455/414.1; 455/414.2; 455/415; 455/416; 707/622

(58) Field of Classification Search
CPC .............. H04L 29/08108; H04L 29/08306; H04W 4/02; H04M 2207/18
USPC ............ 455/414.1–414.2, 415–417; 707/622; 709/205–207
See application file for complete search history.

(56) References Cited

U.S. PATENT DOCUMENTS

| | | | |
|---|---|---|---|
| 5,651,060 A * | 7/1997 | Cohn et al. ............... | 379/215.01 |
| 2009/0112984 A1* | 4/2009 | Anglin et al. ............. | 709/204 |
| 2009/0259674 A1* | 10/2009 | Griffin et al. ............. | 707/101 |
| 2010/0049608 A1* | 2/2010 | Grossman ................ | 705/14.55 |

* cited by examiner

*Primary Examiner* — Wayne Cai
(74) *Attorney, Agent, or Firm* — Buckley, Maschoff & Talwalkar LLC

(57) ABSTRACT

According to some embodiments, a remote server may receive, from a first communication device associated with a first user, information about a first communication event between the first user and another party. The remote server may store the information about the first communication event. The remote server may also receive, from a second communication device associated with a second user, a request associated with the other party. Responsive to the request, the remote server may retrieve and transmit information about the first communication event to the second communication device.

22 Claims, 13 Drawing Sheets

SYSTEMS AND METHODS TO PROVIDE COMMUNICATION HISTORY FOR COMMUNICATION DEVICES

BACKGROUND

1. Field

Embodiments may generally relate to communication devices, such as mobile communication devices. More particularly, some embodiments may be concerned with efficiently providing communication history information to a user of a communication device.

2. Description

A user of a communication device, such as a Smartphone, may access an application on the device to initiate and receive events associated with communications between the user and other people and devices. For example, a user might receive a wireless telephone call from another person. A user may also communicate via other applications executing on the mobile device, such as an email application, a contact application, and/or a calendar application. Similarly, external business applications such as Customer Relationship Management (CRM) applications, social networking sites (such as Facebook or Twitter), and/or third party applications might be used to communicate with others.

Note that more than one user (e.g., associated with multiple mobile communication devices) associated with an enterprise might communicate with the same party. For example, a first employee of a company might use his Smartphone to place a telephone call to a customer on Monday, and a second employee might use her Smartphone to send an email to the same customer on Tuesday. The second employee, however, might be completely unaware that the first employee called the customer the previous day. As a result, when a user performs typical day-to-day communication operations using a mobile communication device, he or she may be unable to quickly get an accurate overview of a situation and view related data that pertains to a person or enterprise associated with prior communication events. For example, an employee who receives a telephone call from a potential client might not realize that his or her boss had already discussed a particular issue with that potential client via a social networking site.

Systems and methods are therefore desired to integrate and provide information about previous communications, including communications associated with other users and/or other mobile communication devices.

SUMMARY

Some embodiments provide a system, method, program code and/or means to receive, from a first mobile communication device associated with a first user, information about a first communication event between the first user and another party. The information about the first communication event may be stored. A request associated with the other party may be received from a second mobile communication device associated with a second user. Responsive to the request, information about the first communication event may be retrieved and transmitted to the second mobile communication device. In this way, the second user may be made aware prior communication events with the other party (e.g., prior events associated with other users and/or other mobile communication devices).

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts.

DETAILED DESCRIPTION

Figure 1:
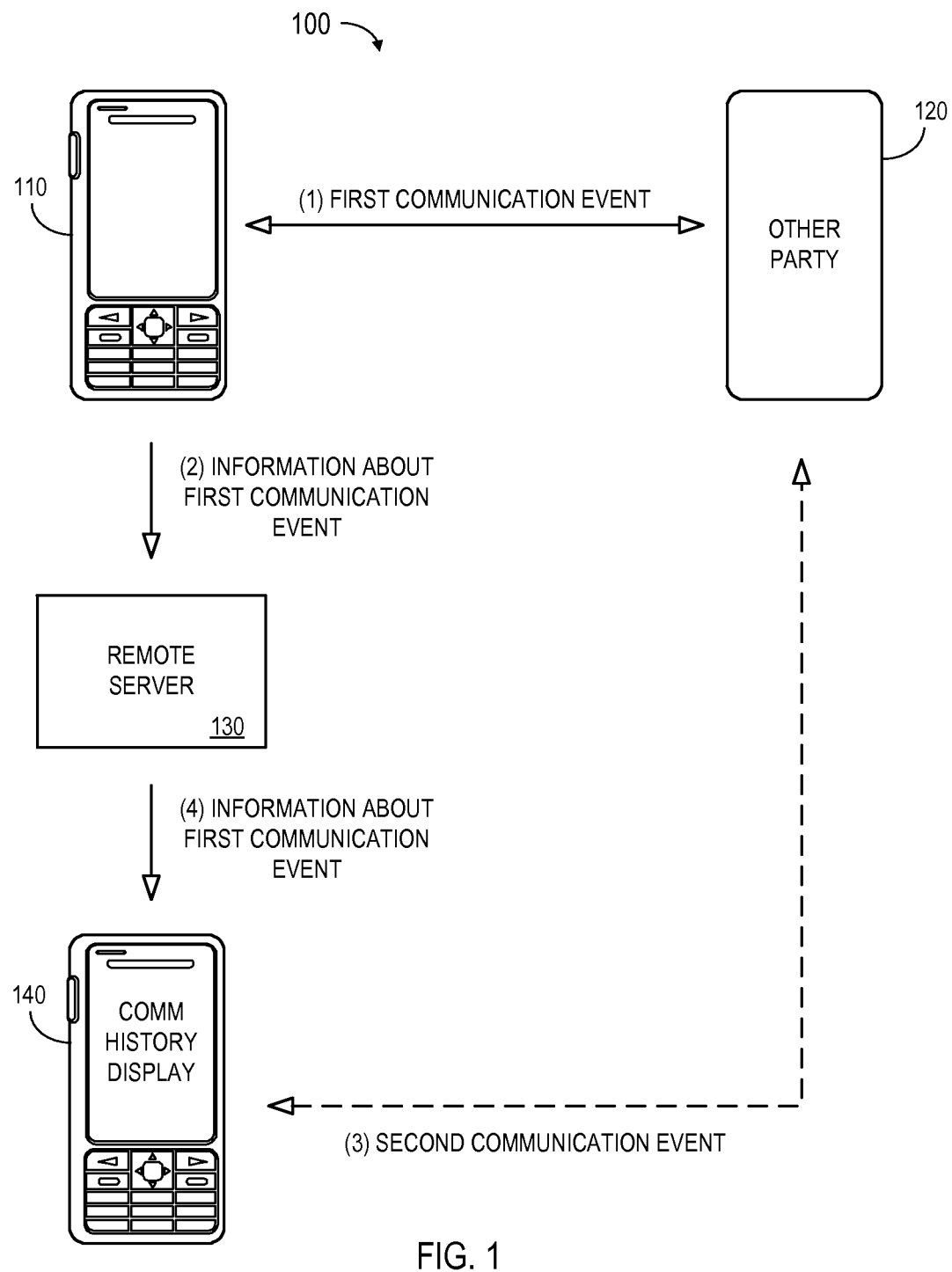
FIG. 1 is a block diagram of a system according to some embodiments.

FIG. 1 is a block diagram of a system 100 according to some embodiments. In particular, at (1) a first mobile communication device 110, associated with a first user, may transmit information to or receive information from another party or device 120. The other party or device 120 might comprise, for example, another mobile communication device. As used herein, a "mobile communication device" may be associated with, for example, a wireless Smartphone, radiotelephone, a Personal Digital Assistant (PDA), portable computing device, or any device adapted to exchange information with other devices. Note that either party or device 110, 120 might not be mobile communication device. For example, a party or device 110, 120 might be a land line telephone, a computer, a web-based communication server, or any other type of device able to exchange information (e.g., in connection with Microsoft Outlook and/or salesforce applications).

According to some embodiments, a first communication "event" may occur between the first and second devices 110, 120. As used herein, the term "event" might refer to, for example, a telephone call, an email, a calendar event (e.g., a meeting request), a social networking site event (e.g., a post or comment), a text message, including a Simple Messaging Service (SMS) text message, or an image. Note that the event may be either an inbound or outbound event from the perspective of the first mobile communication device 110. Moreover, the event, or log of the event, may include information that can be used as an identifier, address, or key (e.g., a phone number or email address) to identify the parties involved in the communication. Note that in some cases, more than two parties could be involved in a single communication event (e.g., the first mobile communication device 110 might send an email to three other devices).

At (2), information about the first communication event is provided from the first mobile communication device 110 to a remote server 130 (e.g., related to a CRM application) which may store the information. The information might include, for example, the identity of the other party 120, the type of event (e.g., an inbound phone call or an outbound SMS message), a time/date of the event, a duration of the event, a subject of the event (e.g., the subject line of an email message), etc. Note that the first mobile communication device 110 might transmit the information about the first event immediately or might instead locally store the information to be uploaded to the remote server 130 later (e.g., on a periodic basis). As used herein, the remote server 130 is "remote" from the first mobile communication device 110 in that it is physically distant from the first mobile communication device 110 and/or needs to communicate with the first mobile communication device 110 via one or more wireless networks.

A second user may then initiate a communication history display at a second mobile communication device 140. For example, the user might enter a search term and/or select a button or icon associated with the communication history display. According to some embodiments, the user establishes a second communication event at (3) between the second mobile device 140 and the other party 120, which may automatically initiate display of communication history information. Note that the first and second communication events could be different types of events (e.g., email messages, calendar appointments, and/or telephone calls).

At (4), information about the first communication event (between the first mobile communication device 110 and the other party 120) is transmitted from the remote server 130 to the second mobile device 140. For example, the second mobile device 140 might initially send a request to the remote server 130, including a phone number or other information identifying the other party 120. The remote server 130 might search locally stored information to determine all prior communication events associated with the other party 120 and transmit a response to the request including the appropriate information. In this way, a user of the second mobile device 140 can be made aware of other communications that involved the other party 120 (even when those other communications involved other users and/or other mobile devices).

Figure 2:
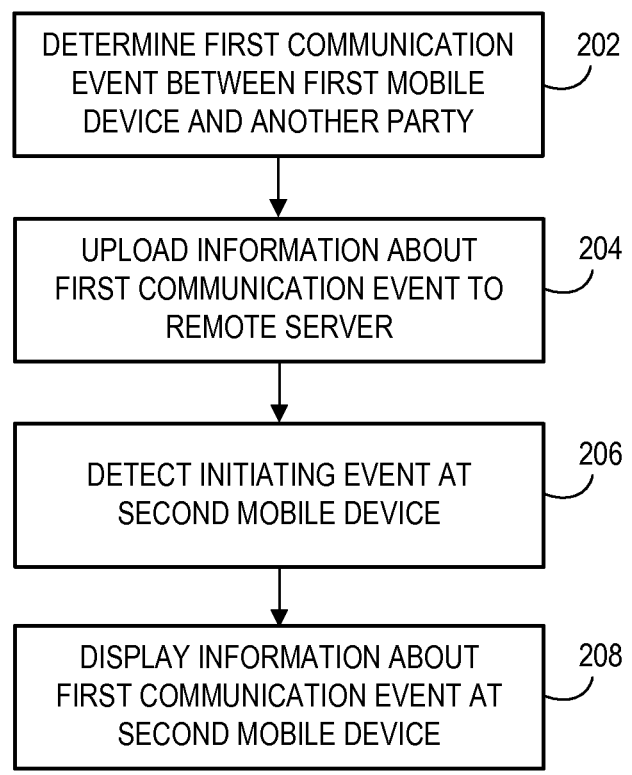
FIG. 2 is a flow diagram of a remote server process according to some embodiments.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, it may be determined that a first communication event occurred between a first mobile device and another party. For example, a first user might use the first mobile device to place a wireless telephone call to the other party. Other examples of communication events might include an email message, a to-do list, a calendar event (e.g., a meeting request), a social networking site event (e.g., a post or comment), a text message, including a Simple Messaging Service (SMS) text message, or an image message (e.g., sending a picture or posting a video). Note that the event may be either an inbound or outbound event from the perspective of the first mobile communication device. Moreover, the event, or log of the event, may include information that can be used as an identifier, address, or key (e.g., a phone number or email address) to identify the parties involved in the communication. Note that the detection performed at 202 might be associated with a "listening" application or hook to catch the appropriate information when a communication event occurs.

At 204, information about the first communication event may be uploaded to a remote server. For example, the first mobile device might immediately transmit information about the event to a remote server associated with a CRM application (which may then store the information). The information might include, for example, an identity of the other party, an event type (e.g., an inbound phone call or an outbound SMS message), an event time/date, an event duration, a subject associated with the event (e.g., the subject line of an email message), etc. According to some embodiments, the first mobile communication device locally stores the event information to be later uploaded to the remote serve (e.g., on a periodic basis). Note that the remote server might be associated with an application other than a CRM application (e.g., another application that stores contact information). Moreover, information about the communication event might be validated (e.g., to determine if a party associated with the event exists in a CRM application).

At 206, an initiating event may be detected at a second mobile device associated with a second user. The initiating event might comprise, for example, a user request (e.g., he or she may press a physical button or select an icon on a display of the second device). The initiating event might instead comprise, for example, the occurrence of a new or current communication event (e.g., the second user might receive an email from a client).

At 208, information about the first communication event may be displayed at the second mobile device. For example, the second mobile device might transmit an information request to the remote server, including the telephone number of the other party. The remote server might then search through one or more databases or tables to determine all prior events associated with that party. The remote server may then transmit the appropriate information to the second mobile device. For example, a list including a scheduled meeting and telephone call between other users and the client might be displayed to the user. According to some embodiments, the user may then select one of the search results, and further information about the selected search result may be displayed to the user (e.g., so that he or she may "drill down" to view additional details).

Note that the prior communication events might be associated with other users. For example, Mr. Smith of Acme, Inc. might send an email to Ms. Jones of Beta Corp. The next day, Mr. Greene of Acme, Inc. might place a telephone call to Ms. Jones and automatically be shown an indication of the prior days email (e.g., because the remote server is aware that the telephone number and email address of Ms. Jones are linked). Further note, according to some embodiments, that the prior communication events might not directly share any participants. By way of example, Mr. Greene of Acme, Inc. might have instead placed a telephone call to Ms. West of Beta Corp. In this case, the remote server might still arrange to display the prior communication between Mr. Smith and Ms. Jones (e.g., because the remote server is aware that Ms. Jones and Ms. West are linked as being associated with Beta Corp.)

Figure 3:
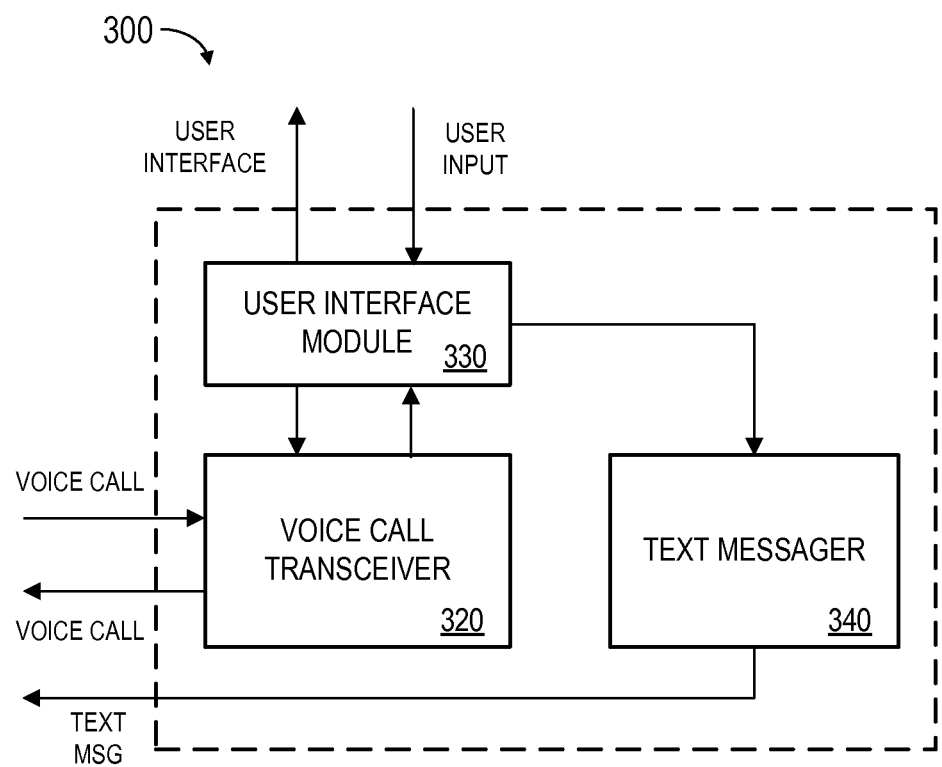
FIG. 3 is block diagram of a mobile communication device according to some embodiments.

FIG. 3 is a block diagram of device 300 according to some embodiments. Device 300 may handle communication events (including voice calls and email messages) and present one or more items of communication history information to a user. Device 300 may comprise different types of portable devices, including cellular telephones, Personal Digital Assistants (PDAs), digital media players, digital cameras, wireless email devices, and any other device for receiving or transmitting various types of communications, such as voice calls, that is or becomes known.

Device 300 includes voice call transceiver 320, user interface module 330, and text messager 340. Each element of device 300 may comprise any combination of hardware and/or software components suitable for providing the functions attributed thereto herein. Two or more of transceiver 320, user interface module 330, and text messager 340 may share one or more constituent components, and, in some embodiments, device 300 may include unshown elements for providing the functions described herein.

Voice call transceiver 320 may receive and transmit voice calls via any suitable protocol. Voice call transceiver 320 may also receive caller information associated with received voice calls. The caller information may comprise caller ID information and/or any other information that device 300 may use to identify a party from whom a voice call is received (and such identification may facilitate a storage and/or display of appropriate communication history information).

A user input may be transmitted to voice call transceiver 320 by user interface module 330. In this regard, voice call transceiver 320 may notify module 330 of the reception of the voice call. User interface module 330 may present a user interface to a user in response to the notification. The user interface, examples of which are described below, may present communication history information related to a received voice call or other communication event detected by the device 300 and/or similar devices.

User interface module 330 may also instruct text messager 340 to transmit a text message. In response, text messager 340 transmits a text message using a suitable text messaging service. The text messaging service may comprise any currently- or hereafter-known text messaging service. Conventional examples include IM, SMS, Multimedia Message Service (MMS), Enhanced Message Service (EMS), and electronic mail.

Communication history about communication events handled by the voice call transceiver 320 and text message 340 may be stored at the device 300 and/or transmitted to a remote server. Moreover, communication history information may be provided to the user as appropriate via the user interface module 330. As a result, some embodiments of the FIG. 1 system 100, the FIG. 2 process, and/or the FIG. 3 device 300 may provide more efficient and enhanced communications than previously available. Although the device 300 illustrated in FIG. 3 may be associated with a wireless telephone network, note that any of the embodiments described herein may be associated with other types of devices, including devices that exchange information (e.g., voice and data) via circuit switched or packet switched protocols (e.g., Internet Protocol (IP) packets).

Figure 4:
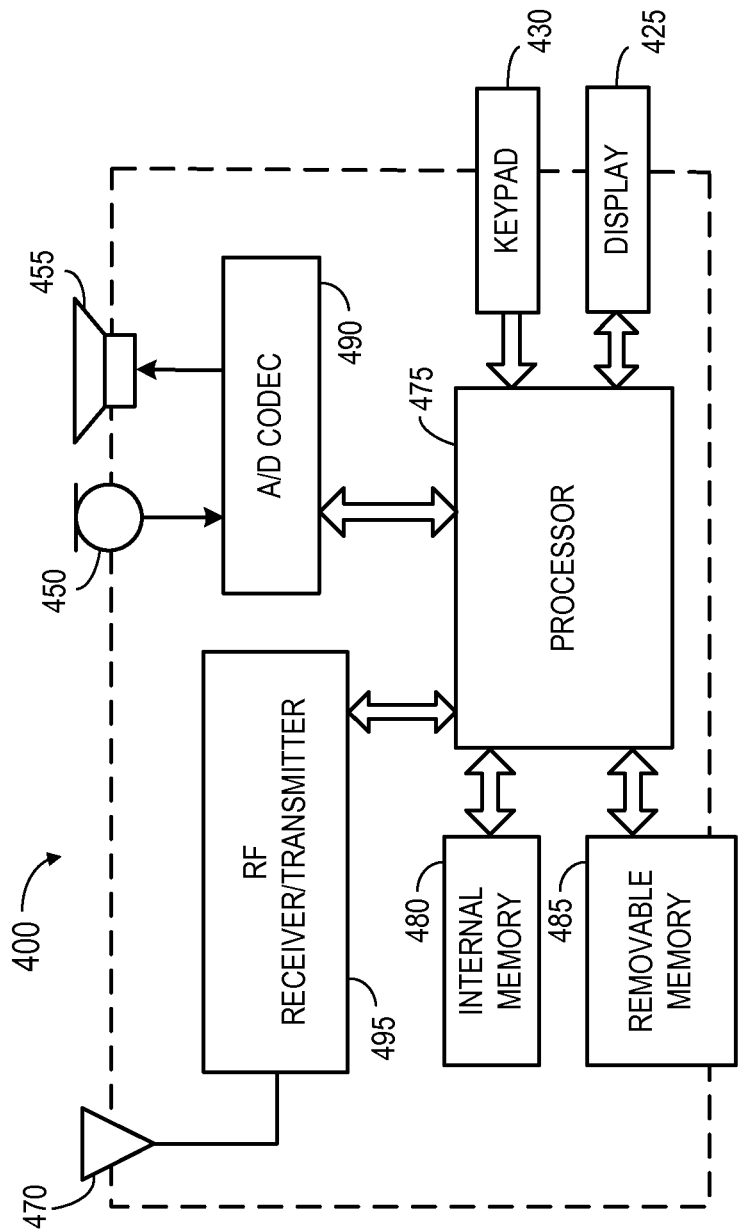
FIG. 4 is a block diagram of the internal architecture of a wireless telephone according to some embodiments.

FIG. 4 is a block diagram of the internal architecture of cellular telephone 400 according to some embodiments. As shown, cellular telephone 400 includes processor 475, which may be a conventional microprocessor, microcontroller and/or digital signal processor (DSP) or other control circuit conventionally provided in a cellular telephone. Processor 475 is shown in communication with keypad 430 and display 425 for control thereof.

Also included in the cellular telephone 400 are internal memory 480 and removable memory 485. Internal memory 480 may include one or more of ROM (read only memory), RAM (random access memory, e.g., static RAM), and flash memory. Removable memory 485 may comprise a flash memory, a Subscriber Identity Module (SIM) card or any other removable memory that is or becomes known. Cellular telephone 400 may therefore be equipped with an interface for physically receiving and transferring data to and from removable memory 485.

Note that a communication event database might be stored in the internal memory 480 and/or the removable memory 485. Memories 480 and 485 may also store program code that is executable by processor 475 to control telephone 400. The program code may include but is not limited to operating system program code, application program code, device driver program code, and database connector program code. The program code may include code to cause cellular telephone 400 to perform functions that are described herein. In some embodiments, the program code is executable to provide a voice call transceiver, a user interface module and a text messager as described with respect to FIG. 3.

Memories 480 and 485 may also store data used in the operation of cellular telephone 400. Such data may include phone numbers, addresses, access codes, stored audio files, text corresponding to the stored audio files, and other data. Some or all of the data may be read-only, while other of the data may be rewritable.

Analog/digital coder/decoder (A/D codec) 490 is also in communication with processor 475. A/D codec 490 may receive analog signals from microphone 450, convert the analog signals to digital signals, and pass the digital signals to processor 475. Conversely, processor 475 may transmit digital signals to A/D codec 490, which converts the digital signals to analog signals and passes the analog signals to speaker 455. Speaker 455 then emits sound based on the analog signals.

RF receiver/transmitter 495 is operatively coupled to antenna 470. RF receiver/transmitter 495 may, in accordance with conventional practices, comprise a combination of two or more different receive/transmit modules (not separately shown) that operate in accordance with mutually different radio communication protocols to provide various services for the cellular telephone 400. For example, receiver/transmitter 495 may operate in accordance with one radio communication protocol to provide conventional two-way service for cellular telephone 400, and may operate in accordance with another radio communication protocol to provide PoC service for cellular telephone 400.

Those in the art will understand that the block diagram of FIG. 4 is simplified in a number of ways. For example, all power and power management components of cellular telephone 400 are omitted from the diagram. Also, some embodiments may employ an internal architecture somewhat different or completely different from that shown in FIG. 4.

Figure 5:
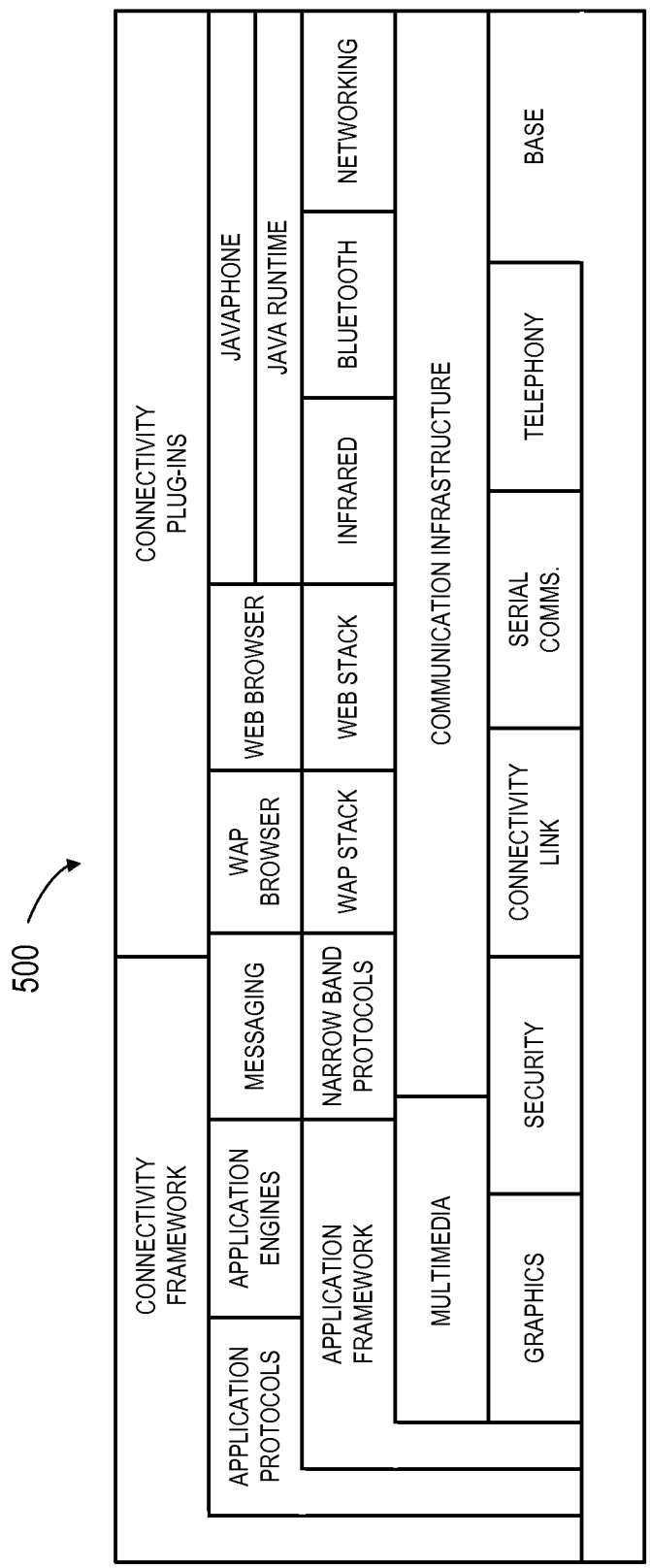
FIG. 5 is a block diagram of a telephone operating system according to some embodiments.

FIG. 5 is a block diagram of an operating system architecture 500 that may be used in conjunction with some embodiments. Architecture 500 corresponds to the Symbian™ cellular telephone operating system. Any suitable operating system may be used in conjunction with some embodiments, including those not intended and/or usable with cellular telephones. Suitable operating systems according to some embodiments include but are not limited to Palm OS™, Windows Mobile™, RIM Blackberry™, and operating systems suitable for devices capable of transmitting text messages (e.g., PDAs and digital media players). According to some embodiments, the application engines portion of the architecture includes at least one engine to transmit, receive, and/or display communication history information as appropriate.

Figure 6:
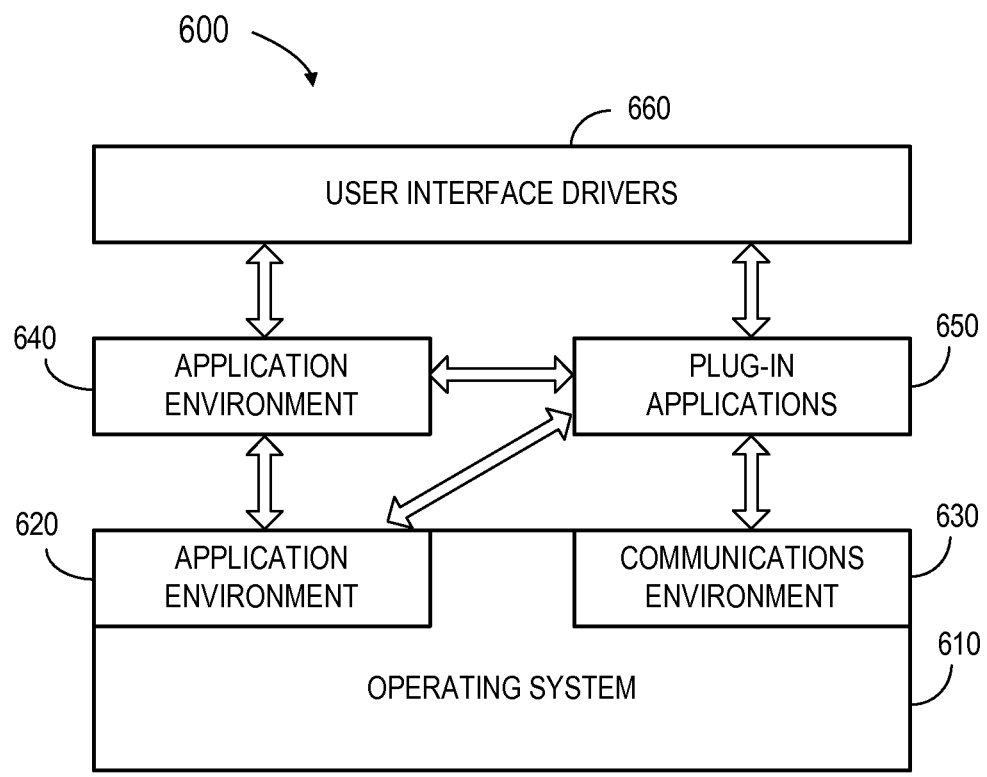
FIG. 6 is a block diagram of the software architecture of a telephone according to some embodiments.

FIG. 6 is a block diagram of a general software architecture 600 that may be used within a cellular telephone in conjunction with some embodiments. Architecture 600 may operate to detect communication events initiated at or received by the telephone and to display communication history information about past events to a user of the telephone.

Architecture 600 includes operating system 610, which may comprise architecture 500 of FIG. 5. In such a case, application environment 620 and communications environment 630 may correspond, respectively, to the connectivity framework and the connectivity plug-ins of architecture 500. Generally, application environment 620 provides a platform by which another application environment 640 may interface with operating system 610. Application environment 640 may comprise a C, Java™ or any other programming environment. As such, plug-in applications 650 may be written in Java or C for execution by cellular telephone. Plug-in applications 650 may also be written for the application interface provided by application environment 620.

Communications environment 630 provides plug-in applications 650 with access to the communications functionality of operating system 610. This functionality may include text messaging, Web browsing and of course telephone communication. Plug-in applications 650 may also transmit data and commands to and receive input from user interface drivers 660 for control of the user interfaces of telephone.

Figure 7:
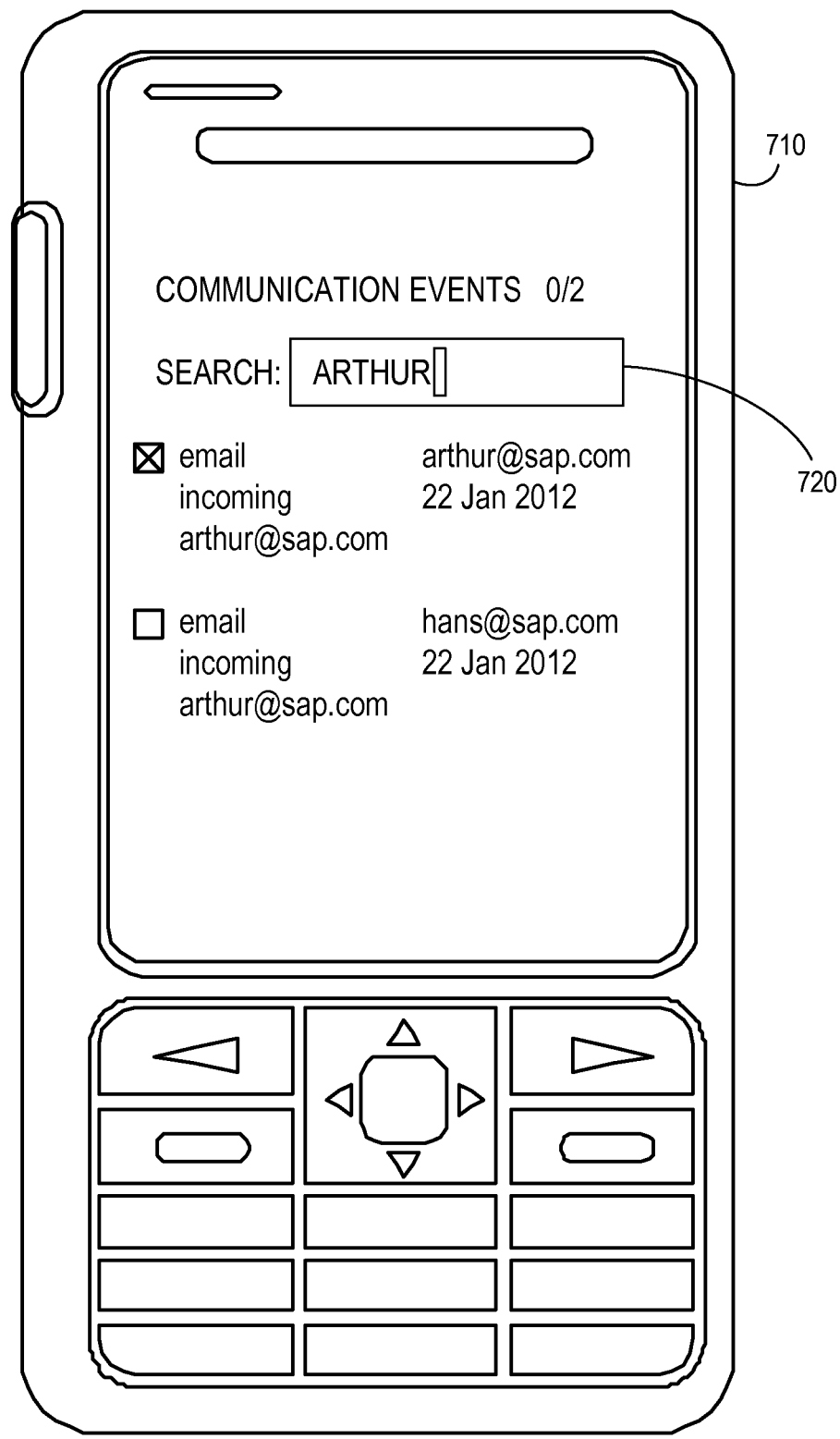
FIG. 7 illustrates a wireless telephone list/search screen display according to some embodiments of the present invention.

According to some embodiments, an application executing in the application environment 620 transmits and/or receives communication history information via a remote server. Moreover, communication history information may be displayed to a user of the telephone. For example, FIG. 7 illustrates a mobile communication device 710 display of list/search screen for communication events. The display may let a user easily and quickly determine information about other communication events that may be of interest. For example, the user might enter a telephone number, email address, name, or portion of a name into a search box 720. As a result, the display may be updated with a list of prior communication events matching the entered information (e.g., based on a request transmitted to, and response received from, a remote server)—including events between "Arthur" and other Smartphones.

Figure 8:
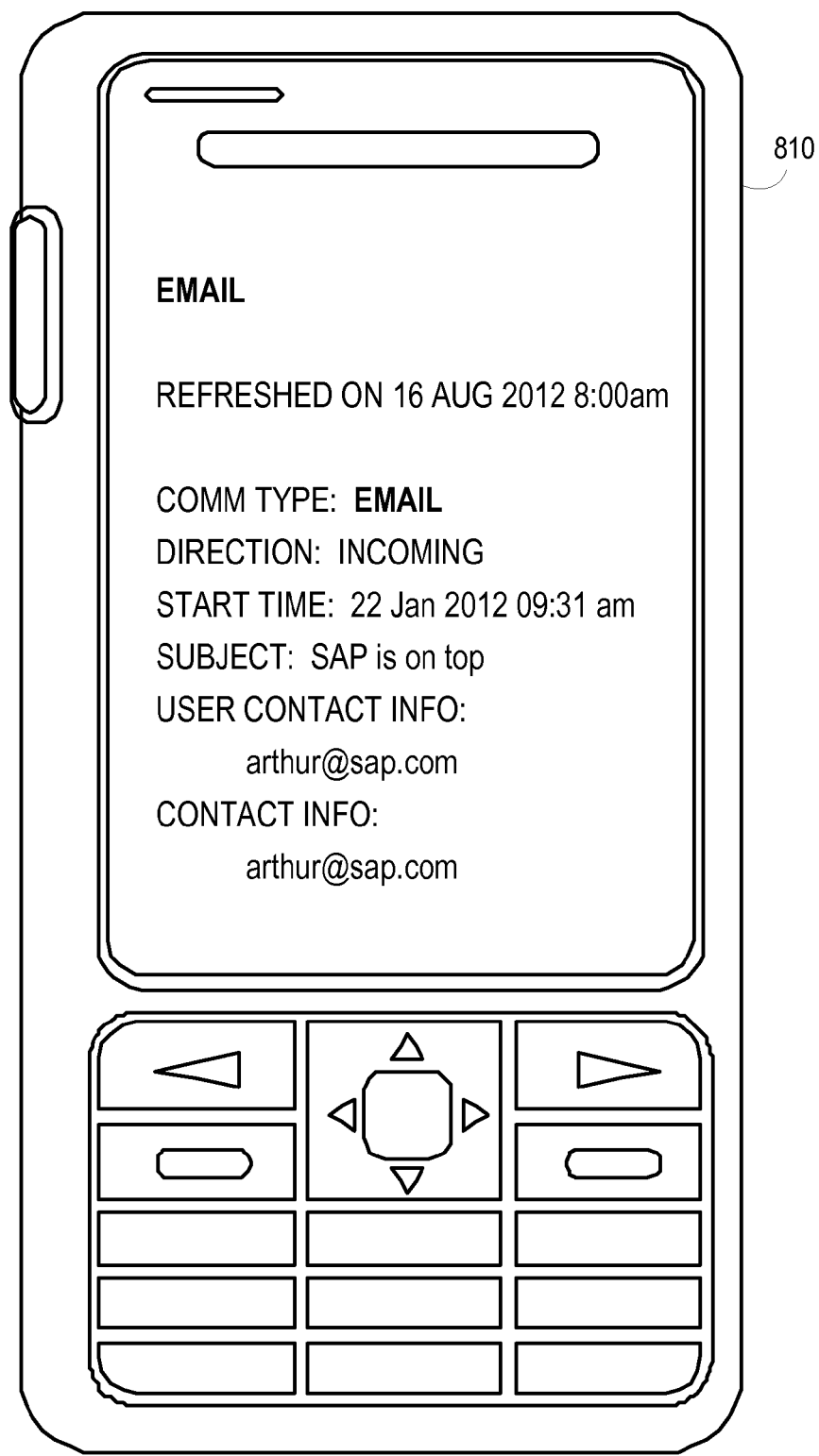
FIG. 8 illustrates a wireless telephone details screen display according to some embodiments of the present invention.

A user might select one or more of the prior communication events to receive further details about that event. For example, FIG. 8 illustrates a mobile communication device 810 display of a detail screen for a communication event. In this example, the details of a particular prior email, including a communication type, direction, time, subject, and contact information are displayed to the user.

Figure 9:
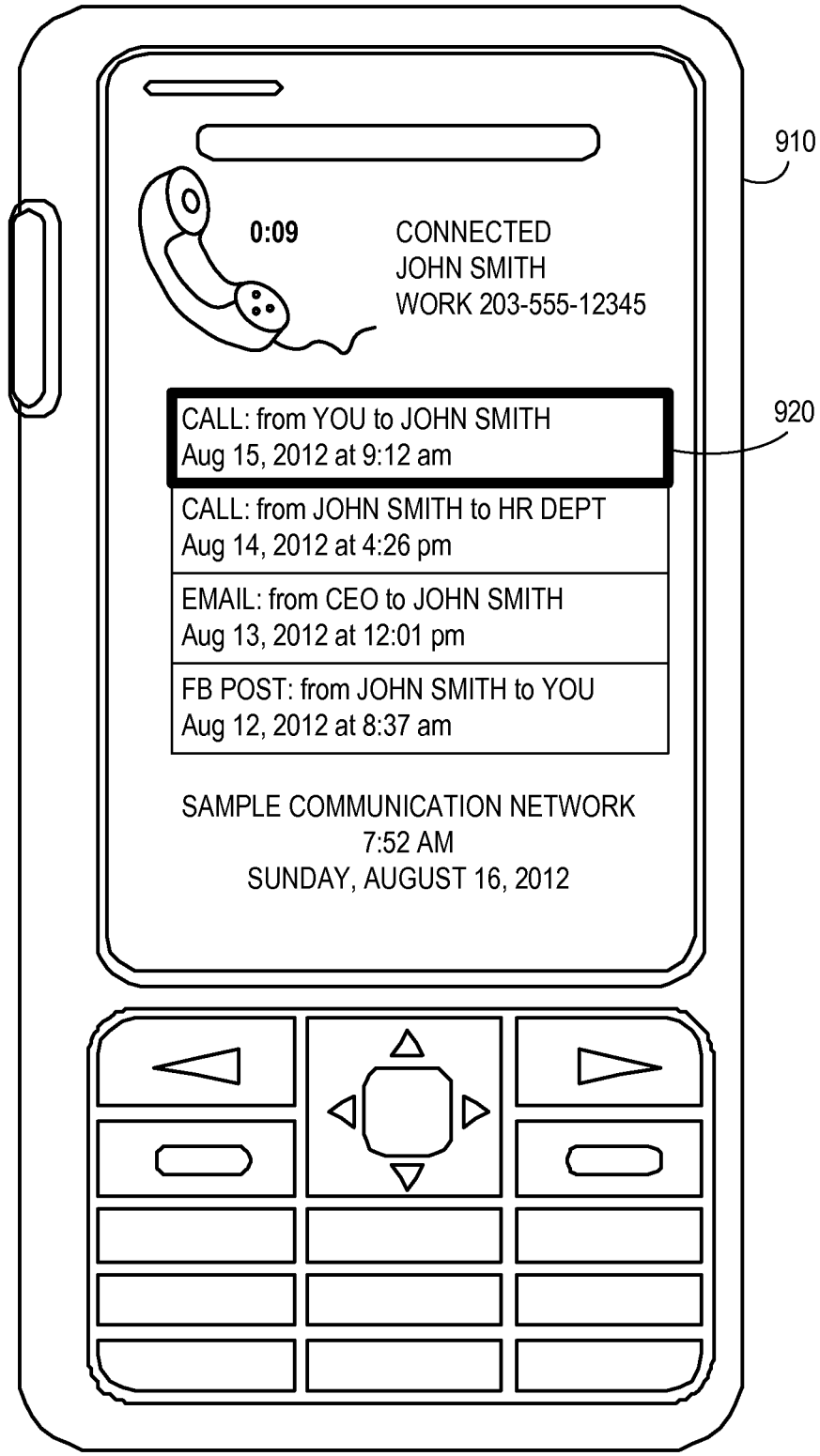
FIG. 9 illustrates a wireless telephone call display according to some embodiments of the present invention.

Instead of entering a search term into a search box as described with respect to FIG. 7, information about prior communication events might be automatically displayed to a user when or she initiates a new or current communication event (e.g., communication history data might be displayed in a native phone application during an incoming or outgoing call). For example, FIG. 9 illustrates a mobile communication device 910 display provided to a user who is currently connected to "JOHN SMITH." Based on the current connection, the display includes a list of other communication events with John Smith, including other telephone calls, emails, and Facebook posts. Moreover, some of the other events are between John Smith and other users (e.g., the email message from the CEO to John Smith on Aug. 13, 2009).

In this way, embodiments may integrate phone communications (including email, voice, and SMS text communication) and Personal Information Management (PIM) apps (e.g., an address book, calendar, and to-do list) with a communication history at a mobile device. Embodiments may allow a user to quickly navigate between phone applications using the information currently being viewed (e.g., prior events) to related data such as CRM information (e.g., contacts, accounts, cases, and/or data in social networks).

Figure 10:
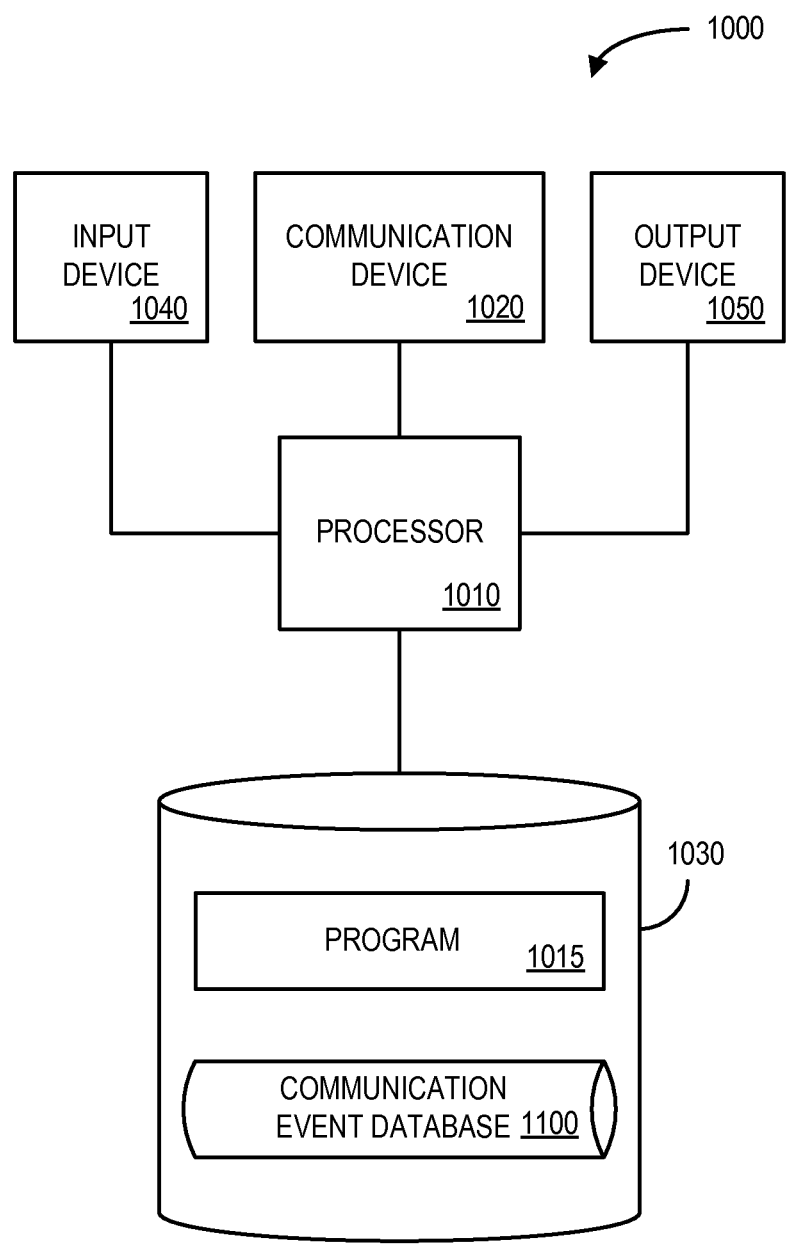
FIG. 10 is a block diagram of a mobile communications device in accordance with some embodiments of the present invention.

FIG. 10 is a block diagram of a remote server 1000 in accordance with some embodiments of the present invention. The remote server 1000 might, for example, comprise a CRM platform or engine similar to the remote server 130 illustrated in FIG. 1. The remote server 1000 comprises a processor 1010 coupled to a communication device 1020 configured to communicate via a communication network (not shown in FIG. 10). The communication device 1020 may be used to exchange communication information, for example, with one or more mobile communication devices.

The processor 1010 is also in communication with an input device 1040. The input device 1040 may comprise, for example, a keyboard, a mouse, or computer media reader. Such an input device 1040 may be used, for example, to let an administrator provide configuration and set-up information. The processor 1010 is also in communication with an output device 1050. The output device 1050 may comprise, for example, a display screen or printer. Such an output device 1050 may be used, for example, to generate reports for an administrator or operator.

The processor 1010 is also in communication with a storage device 1030. The storage device 1030 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 1030 stores a program 1015 for controlling the processor 1010. The processor 1010 performs instructions of the program 1015, and thereby operates in accordance any embodiments of the present invention described herein. For example, the processor 1010 may receive, from a first mobile communication device associated with a first user, information about a first communication event between the first user and another party. The processor 1010 may store the information about the first communication event. The processor 1010 may also receive, from a second mobile communication device associated with a second user, a request associated with the other party. Responsive to the request, the processor 1010 may retrieve and transmit information about the first communication event to the second mobile communication device.

As used herein, information may be "received" by or "transmitted" to, for example: (i) the remote server 1000 from other devices; or (ii) a software application or module within the remote server 1000 from another software application, module, or any other source.

As shown in FIG. 10, the storage device 1030 also stores a communication event database 1100. One example of such a database 1100 that may be used in connection with the remote server 1000 will now be described in detail with respect to FIG. 11. The illustration and accompanying descriptions of the database presented herein are exemplary, and any number of other database arrangements could be employed besides those suggested by the figures. For example, note that some or all of the information in the local communication event database might be stored at a mobile communication device.

Figure 11:
FIG. 11 is a tabular view of a portion of a communication event database in accordance with some embodiments of the present invention.

FIG. 11 is a tabular view of a portion of a communication event database 1100 in accordance with some embodiments of the present invention. The table includes entries associated with various communication events that have been initiated or received by mobile communication devices. The table also defines fields 1102, 1104, 1106, 1108, 1110 for each of the entries. The fields specify: an event identifier 1102, an event type 1104, an event day/time 1106, event participants 1108, and associated event IDs 1110. The information in the database 1100 may be periodically created and updated based on events initiated from or received by mobile communication devices.

The event identifier 1102 may be, for example, an alphanumeric code associated with a particular communication event, and the event type 1104 might indicate a native application that initiated or received the event (e.g., that the event was an inbound telephone call or an outbound email). The event date/time 1106 might indicate when the event occurred and/or how long the event lasted. The event participants 1108 might include one or more communication addresses of the parties involved in the communication event (e.g., a name, telephone number, and/or an email address). The associated event IDs 1110 might indicate that the remote server has already determined that other events are related to the event associated with the event identifier 1102. In other embodiments, the related events are determined when a request is received from a mobile communication device.

Figure 12:
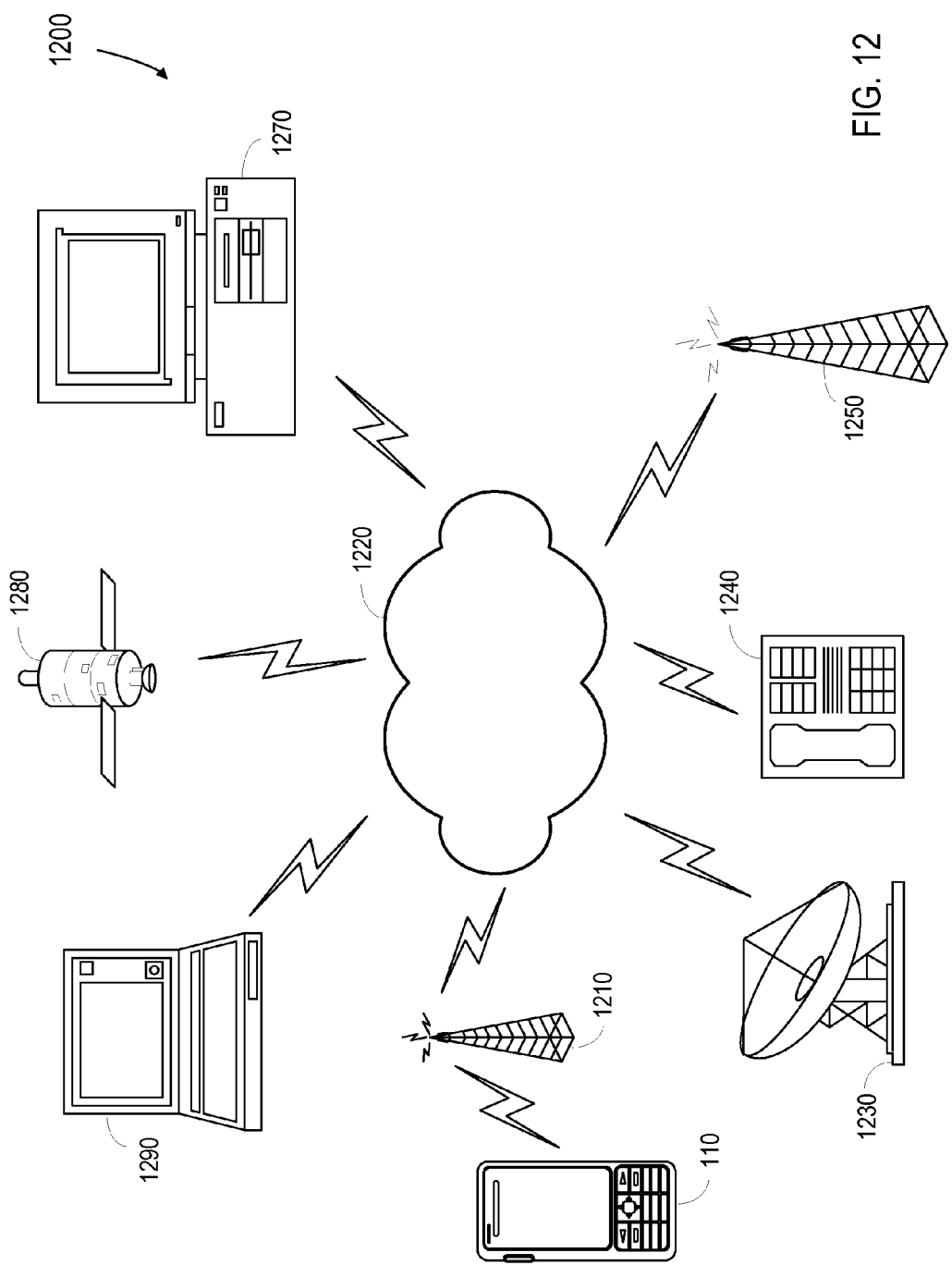
FIG. 12 is a diagram of a system architecture according to some embodiments.

The above-mentioned communication event signals, such as voice calls and text messages, may pass through any number of networks, devices and protocols before reaching their intended recipient. FIG. 12 is a partial diagram of a communication architecture 1200 according to some embodiments.

Mobile communication device 110 (in this example, a cellular telephone) is shown in communication with tower 1210, which may forward the transmission to communication network 1220 according to governing protocols. Communication network 1220 may include any number of devices and systems for transferring data, including but not limited to local area networks, wide area networks, telephone networks, cellular networks, fiber-optic networks, satellite networks, infra-red networks, radio frequency networks, and any other type of networks which may be used to transmit information between devices. Additionally, data may be transmitted through communication network 1220 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Devices 1230 through 1290 are examples of some devices that may be a part of or in communication with communication network 1220. As such, devices 1230 through 1290 may receive communication events, either as intended recipients or as network nodes for passing messages. Devices 1230 through 1290 include satellite transmitter/receiver 1230, landline telephone 1240 having a subscriber line interface circuit to receive a telephone line (e.g., a cordless phone or a corded phone), communication tower 1250, desktop computer or server 1270, satellite 1280 and portable computing device 1290. Note the server 1270 might be associated with, for example, a remote database containing CRM information (e.g., to be searched in response to a request received from a communication history application executing at the mobile communication device 110). Any other suitable devices may be used as a transmitting device or a receiving device in conjunction with some embodiments.

The elements of system 1200 may be connected differently than as shown. For example, some or all of the elements may be connected directly to one another. Embodiments may include elements that are different from those shown. Moreover, although the illustrated communication links between the elements of system 1200 appear dedicated, each of the links may be shared by other elements. Elements shown and described as coupled or in communication with each other need not be constantly exchanging data. Rather, communication may be established when necessary and severed at other times or always available but rarely used to transmit data.

Figure 13:
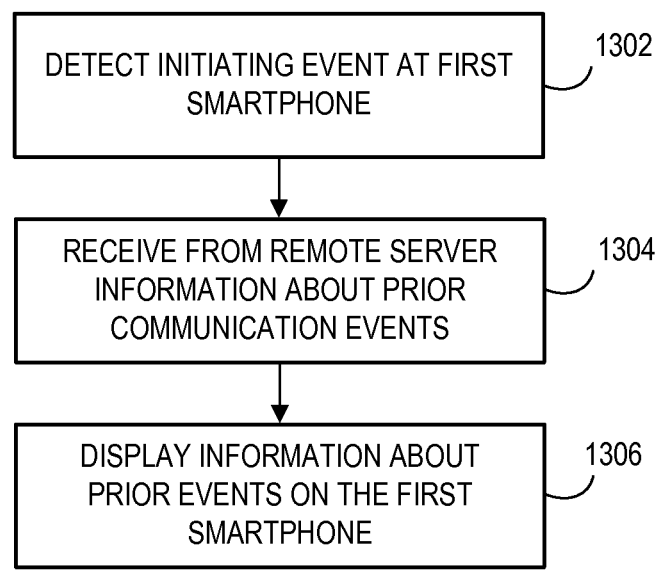
FIG. 13 is a flow diagram of a mobile communication device process according to some embodiments.

FIG. 13 illustrates a method that might be performed, for example, by the mobile communication device 110 (e.g., Smartphone) of the system 1200 described with respect to FIG. 12 according to some embodiments. At 1302, the mobile communication device 110 detects an initiating event associated with another party. For example, a first user associated with the mobile communication device 110 might enter another party's name or telephone number in a communication history search box or might place a call (or send an email message) to the other party.

The devices might then transmit a request to a remote server (e.g., including the other party's name and/or telephone number) and, at 1304, receive from the remote server information about one or more prior communication events. The prior communication events may, for example, be between other communication devices and the other party. At 1306, the mobile communication device 110 displays information about the prior communication events to the first user (e.g., a list of prior events).

Thus, embodiments may automatically collect and upload communication history information from Smartphone clients to a server (e.g., email, voice calls, calendar entries, and/or text messages). This information may then be available to search and to be used as related data for a contact or an account. Various types of different communications with the contact may be tracked, including from other parties in a company or team (e.g., depending on visibility parameters set by an operator or administrator). For example, Sally calls John, and Kevin calls John. When the systems searches for John in a mobile contact application, entries for both voice calls might be found and thus a "shared communication history" may be provided. As a result, a user may easily find past communications with a contact, along with the type of communication and possibly some or all of the content (e.g., the text of an SMS message).

The system may also collect information from other on-premise or on-demand applications (e.g., MICROSOFT Outlook and/or Salesforce) as well as other types of communication (Skype and/or VOIP communications). The information may, according to some embodiments, also be used for analytics on the server to evaluate various communications for the purpose of optimization and tracking (e.g., communication volume with a company, communication "cost" to close a deal, and/or best practices).

By way of example, a client application might capture the following for a voice call: a user identifier, an incoming/outgoing indication, a telephone number, a contact name, a timestamp, a duration, and/or any notes associated with the call. Similarly, for an email message, a client application might capture: a user identifier, an incoming/outgoing indication, to and from addresses, cc: addresses, a timestamp, a subject, a message body and/or any attachments. For a calendar event, the client application might capture: a user identifier, a subject, a timestamp, a duration, and any notes associated with a meeting. The captured information may be automatically uploaded to a server immediately at the time of "creation" for storage (e.g., on mail received/sent, voice call received/sent, appointment created, changed, or deleted). According to some embodiments, if the information cannot be sent to the server, it may be stored locally on the client and later uploaded together with the next communication event.

According to some embodiments, only information that matches an existing contact in a CRM system is stored on the server. After being stored, the communication history may be searched from clients and may be displayed in a list/detail screen, and may also be available as related data (e.g., related "communications") for either a contact or an account.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and engines described herein may be split or combined). Moreover, other types of communication applications and/or search techniques may be used in addition to, or instead of, those described herein.

According to some embodiments, a current or prior communication event may be "parsed" to determine one or more context tokens that may be of interest to a user. Moreover, according to some embodiments, the tokens may be stored at the server and might include, for example, an event type (e.g., indicating which native application was associated with the event), an event date, an event time, a party identifier, an event subject, an event duration, attachment information, and/or a "parsed" token key words or phrases (e.g., strings of characters that might be of interest to users at a later time).

According to some embodiments, a list of context tokens may be displayed to the user. For example, when a user receives an email, a context application might automatically parse text information associated with the email using a keyword list and display a set of tokens to the user. The set may be prioritized (e.g., with those tokens more likely to be of interest being placed near the top of the display). The user may then select one or more of the context tokens. Those selected tokens can be used to perform a search of prior communication events and the result of the search may be displayed to the user. Note that the parsing might be associated with a keyword list, an alias list (e.g., correlating nicknames and abbreviations), a language analyzer (e.g., using the syntax of one or more languages to identify potential tokens of interest), and/or a speech-to-text converter.

For example, if an initiating event was an email from a client, the "from" and "subject" portions of the email might be used to search a communication history database for similar items. Such information might be associated with, for example, CRM systems, news sources, social networking systems, and/or contact management systems. According to one embodiment, a mobile communication device makes a web service call to an application executing at a remote server using a preconfigured or known service access point in order to search for communication history data. Moreover, some or all of the embodiments described herein might be implemented using Application Programming Interfaces and/or a web application framework for a programming language (e.g., Ruby on Rails).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:
   determining, at a first mobile communication device associated with a first user, a first communication event between the first user and another party;
   uploading information about the first communication event to a remote server, including information identifying the first user and the other party;
   determining, at a second mobile communication device associated with a second user, a second communication event between the second user and the other party;
   uploading information about the second communication event, including information identifying the second user and the other party, from the second mobile communication device to the remote server;
   responsive to the second communication event, arranging for information about the first communication event, including the information identifying the first user and the other party, to be displayed at the second mobile communication device;
   determining, at the second mobile communication device, a third communication event between the second user and an additional party, wherein the additional party is different than but associated with the other party;
   uploading information about the third communication event from the second mobile communication device to the remote server, including information identifying the second user and the additional party; and
   displaying, on the second mobile communication device, the information associated with the first, second, and third communication events.

2. The method of claim 1, wherein the second communication event is associated with at least one of: (i) an email application, (ii) an address book, (iii) a calendar application, (iv) a telephone application, (v) a to-do list, (vi) a contact application, (vii) a client relation management application, (viii) a social networking application, (ix) a web browser, or (x) a text messaging application.

3. The method of claim 1, wherein said arranging comprises:
   receiving, at the second mobile communication device from the remote server, information associated with the first communication event, including information identifying the first user and the other party.

4. The method of claim 1, wherein the second communication event is associated with at least one of: (i) a communication received by the second communication device, or (ii) a communication transmitted from the second communication device.

5. The method of claim 1, wherein the first communication event and the second communication event are associated different ones of: (i) a telephone call, (ii) an email, (iii) a calendar event, (iv) a social networking site event, (v) a text message, or (vi) an image.

6. The method of claim 1, wherein the information displayed by the second communication device includes at least one of: (i) a user identifier, (ii) a telephone number, (iii) an outgoing/incoming indication, (iv) a contact name, (v) a timestamp, (vi) an event duration, (vii) a notation, (viii) a cc: list, (ix) a subject description, (x) a message body, or (xi) a calendar appointment.

7. The method of claim 1, wherein the second communication device locally stores the information about the second communication event before uploading it to the remote server.

8. The method of claim 1, wherein the remote server is associated with a customer relationship management system.

9. A non-transitory, computer-readable medium storing instructions adapted to be executed by a processor to perform a method, said method comprising:
 determining, at a second mobile communication device associated with a second user, a second communication event between the second user and another party, wherein a first mobile communication device, associated with a first user, had previously determined a first communication event between the first user and the other party and uploaded information about the first communication event to a remote server, including information identifying the first user and the other party;
 uploading information about the second communication event, including information identifying the second user and the other party, from the second mobile communication device to the remote server;
 responsive to the second communication event, arranging for information about the first communication event, including the information identifying the first user and the other party, to be displayed at the second mobile communication device;
 determining, at the second mobile communication device, a third communication event between the second user and an additional party, wherein the additional party is different than but associated with the other party;
 uploading information about the third communication event from the second mobile communication device to the remote server, including information identifying the second user and the additional party; and
 displaying, on the second mobile communication device, the information associated with the first, second, and third communication events.

10. The medium of claim 9, wherein the second communication event is associated with at least one of: (i) a communication received by the second communication device, or (ii) a communication transmitted from the second communication device.

11. The medium of claim 9, wherein the first communication event and the second communication event are associated different ones of: (i) a telephone call, (ii) an email, (iii) a calendar event, (iv) a social networking site event, (v) a text message, or (vi) an image.

12. The medium of claim 9, wherein the second communication event is associated with at least one of: (i) an email application, (ii) an address book, (iii) a calendar application, (iv) a telephone application, (v) a to-do list, (vi) a contact application, (vii) a client relation management application, (viii) a social networking application, (ix) a web browser, or (x) a text messaging application.

13. The medium of claim 9, wherein the information displayed by the second communication device includes at least one of: (i) a user identifier, (ii) a telephone number, (iii) an outgoing/incoming indication, (iv) a contact name, (v) a timestamp, (vi) an event duration, (vii) a notation, (viii) a cc: list, (ix) a subject description, (x) a message body, or (xi) a calendar appointment.

14. The medium of claim 9, wherein the second communication device locally stores the information about the second communication event before uploading it to the remote server.

15. The medium of claim 9, wherein the remote server is associated with a customer relationship management system.

16. A second mobile communication device associated with a second user, comprising:
 a communication element to transmit and receive data via a network;
 a processor coupled to the communication element; and
 a storage device in communication with said processor and storing instructions adapted to be executed by said processor to:
  determine a second communication event between the second user and another party, wherein a first mobile communication device, associated with a first user, had previously determined a first communication event between the first user and the other party and uploaded information about the first communication event to a remote server, including information identifying the first user and the other party;
  upload information about the second communication event, including information identifying the second user and the other party, from the second mobile communication device to the remote server;
  responsive to the second communication event, arrange for information about the first communication event, including the information identifying the first user and the other party, to be displayed at the second mobile communication device;
  determine, at the second mobile communication device, a third communication event between the second user and an additional party, wherein the additional party is different than but associated with the other party;
  upload information about the third communication event from the second mobile communication device to the remote server, including information identifying the second user and the additional party; and
  display, on the second mobile communication device, the information associated with the first, second, and third communication events.

17. The second mobile communication device of claim 16, wherein the second communication event is associated with at least one of: (i) a communication received by the second communication device, or (ii) a communication transmitted from the second communication device.

18. The second mobile communication device of claim 16, wherein the first communication event and the second communication event are associated different ones of: (i) a telephone call, (ii) an email, (iii) a calendar event, (iv) a social networking site event, (v) a text message, or (vi) an image.

19. The second mobile communication device of claim 16, wherein the second communication event is associated with at least one of: (i) an email application, (ii) an address book, (iii) a calendar application, (iv) a telephone application, (v) a to-do list, (vi) a contact application, (vii) a client relation management application, (viii) a social networking application, (ix) a web browser, or (x) a text messaging application.

20. The second mobile communication device of claim 16, wherein the information displayed by the second communication device includes at least one of: (i) a user identifier, (ii) a telephone number, (iii) an outgoing/incoming indication, (iv) a contact name, (v) a timestamp, (vi) an event duration, (vii) a notation, (viii) a cc: list, (ix) a subject description, (x) a message body, or (xi) a calendar appointment.

21. The second mobile communication device of claim 16, wherein the second communication device locally stores the information about the second communication event before uploading it to the remote server.

22. The second mobile communication device of claim 16, wherein the remote server is associated with a customer relationship management system.

* * * * *